(12) United States Patent
Beck et al.

(10) Patent No.: US 6,964,434 B2
(45) Date of Patent: Nov. 15, 2005

(54) COUPLING PART BY WHICH AT LEAST ONE TUBULAR OR BAR-SHAPED PART IS CONNECTED TO A FURTHER PART

(75) Inventors: Wolfgang Beck, Niederlauer (DE); Silvio Hamm, Sülzfeld (DE); Manfred Prell, Münnerstadt (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/861,200

(22) Filed: Jun. 3, 2004

(65) Prior Publication Data

US 2005/0012331 A1    Jan. 20, 2005

Related U.S. Application Data

(63) Continuation of application No. PCT/EP02/12707, filed on Nov. 13, 2002.

(30) Foreign Application Priority Data

Dec. 3, 2001 (DE) ................................ 101 59 255

(51) Int. Cl.$^7$ .............................................. F16L 35/00
(52) U.S. Cl. .......................... 285/7; 285/319; 285/307
(58) Field of Search ............................... 283/7, 39, 322, 283/319, 307, 314

(56) References Cited

U.S. PATENT DOCUMENTS

| | | | |
|---|---|---|---|
| 1,273,896 A | * | 7/1918 | Matin ......................... 285/314 |
| 2,784,987 A | * | 3/1957 | Corcoran ...................... 285/82 |
| 3,339,944 A | * | 9/1967 | Poague ......................... 285/39 |
| 4,036,515 A | * | 7/1977 | Karcher et al. .............. 285/315 |
| 4,307,902 A | * | 12/1981 | Schnatzmeyer ................ 285/3 |
| 4,373,753 A | * | 2/1983 | Ayers et al. ................. 285/319 |
| 4,398,757 A | * | 8/1983 | Floyd et al. ................. 285/315 |
| 4,902,045 A | * | 2/1990 | McGugan et al. ............ 285/24 |
| 4,915,421 A | * | 4/1990 | Dennany Jr. ................. 285/39 |
| 5,042,848 A | * | 8/1991 | Shiozaki ..................... 285/277 |
| 5,141,263 A | * | 8/1992 | Varden ........................ 285/314 |
| 5,310,226 A | | 5/1994 | Norkey |
| 5,458,379 A | * | 10/1995 | Hamada et al. ............... 285/39 |
| 5,954,370 A | * | 9/1999 | Pietersen ....................... 285/7 |

FOREIGN PATENT DOCUMENTS

| | | | |
|---|---|---|---|
| EP | 0 937 435 A2 | | 8/1999 |
| FR | 2700196 | * | 6/1993 |

* cited by examiner

*Primary Examiner*—Eric K. Nicholson
(74) *Attorney, Agent, or Firm*—John T. Winburn; Russell W. Warnock; Craig J. Loest

(57) ABSTRACT

A coupling part joins at least one tubular or bar-shaped part to a further part. The coupling part contains at least one sleeve part that accommodates the tubular or bar-shaped part, whereby at least one first detent element is provided on the inside of the sleeve part and interacts with a first counter detent element provided on the tubular or bar-shaped part. The detent connection of the first detent and counter detent element can be disengaged by displacing the sleeve part. A coupling part of the aforementioned type is characterized by its ability to be easily disengaged.

9 Claims, 3 Drawing Sheets

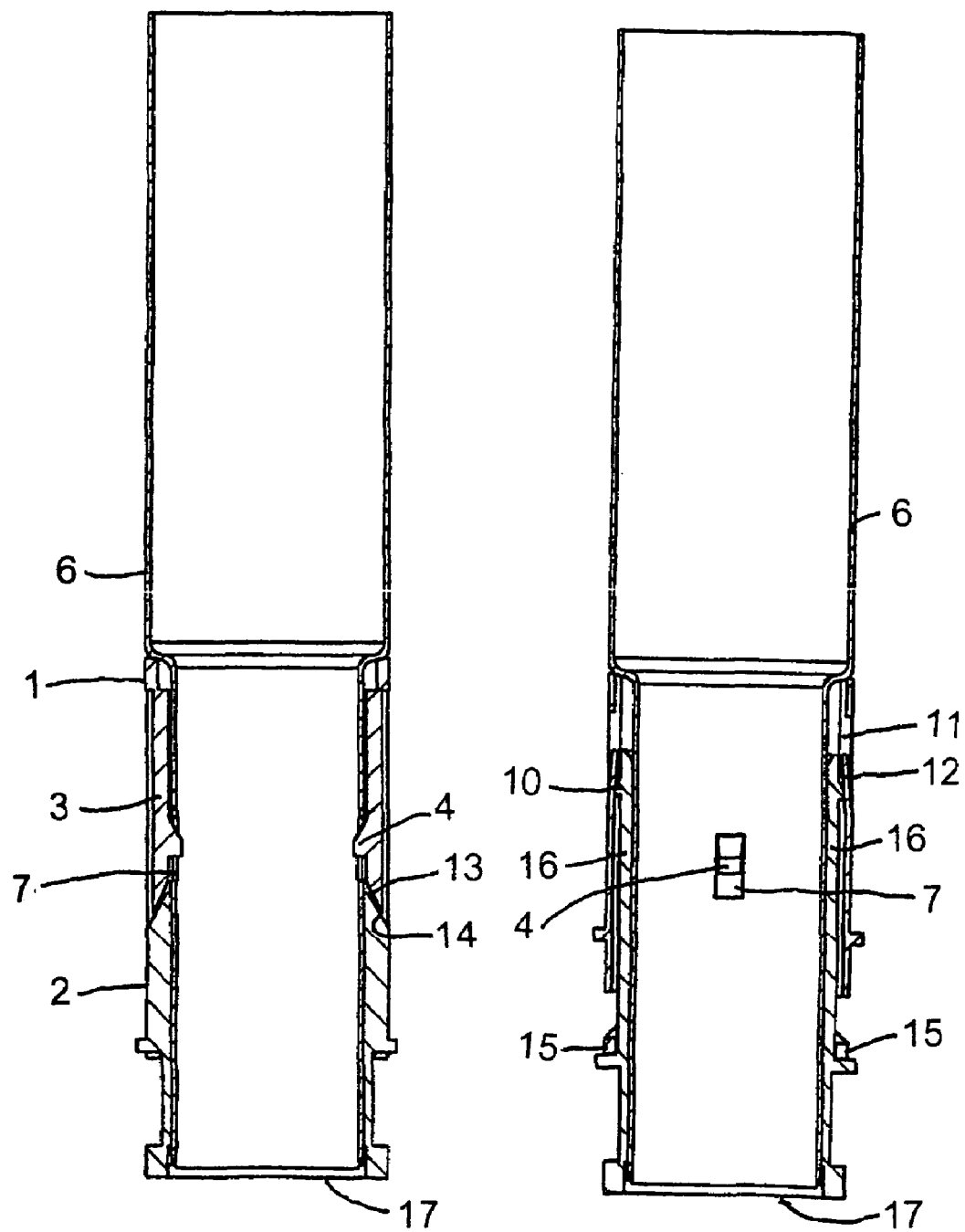

COUPLING PART BY WHICH AT LEAST ONE TUBULAR OR BAR-SHAPED PART IS CONNECTED TO A FURTHER PART

CROSS-REFERENCE TO RELATED APPLICATION

This application is a continuation, under 35 U.S.C. § 120, of copending international application No. PCT/EP02/12707, filed Nov. 13, 2002, which designated the United States; this application also claims the priority, under 35 U.S.C. § 119, of German patent application No. 101 59 255.8, filed Dec. 3, 2001; the prior applications are herewith incorporated by reference in their entirety.

BACKGROUND OF THE INVENTION

Field of the Invention

The invention relates to a coupling part by which at least one tubular or bar-shaped part is connected to a further part.

Such connections are produced, for example, when a vacuum-cleaner tube is plugged onto the connector of a vacuum-cleaner nozzle. In this case, the vacuum-cleaner tube and the plug-on opening of the connector are conical. During vacuuming, the vacuum-cleaner tube is forced to a correspondingly pronounced extent into the accommodating opening of the connector, with the result that it is often only possible to separate the suction tube and nozzle if a high level of force is applied.

SUMMARY OF THE INVENTION

It is accordingly an object of the invention to provide a coupling part by which at least one tubular or bar-shaped part is connected to a further part which overcomes the above-mentioned disadvantages of the prior art devices of this general type, which is distinguished by easy releasability.

With the foregoing and other objects in view there is provided, in accordance with the invention, a coupling part for connecting at least one first part, being either a tubular part or a bar-shaped part, to a second part. The coupling part contains at least one sleeve part for accommodating the first part. The sleeve part has an inside region with at least one first latching element disposed in the inside region. The first latching element interacts with a first mating latching element provided on the first part. A first latching connection of the first latching element and the first mating latching element is releasable by an adjusting movement of the sleeve part.

The object is achieved according to the invention by a coupling part by which at least one tubular or bar-shaped part is connected to a further part. The coupling part has at least one sleeve part which accommodates the tubular or bar-shaped part. The inside of the sleeve part has at least one first latching element, which interacts with a first mating latching element provided on the tubular or bar-shaped part forming a latching connection of the first latching and mating latching elements being releasable by an adjusting movement of the sleeve part. In order to release the connection, all that is required is for the sleeve part to be adjusted correspondingly, which requires barely any force to be applied. Once the first latching and mating latching elements have been unlatched, the tubular or bar-shaped part can be pulled out of the sleeve part, which likewise requires only a low level of force to be applied since, on account of being secured by the latching connection, the tubular or bar-shaped part is only plugged loosely into the sleeve part.

A straight forward latching connection is achieved in that a latching nose is provided as the first latching element at least on one elastic region of the sleeve part, the latching nose being latched in a depression or cutout opening which serves as the first mating latching element and belongs to the tubular or bar-shaped part.

Sufficient elasticity for the functioning of the latching connection is achieved in that the elastic region contains a strip that is separated off from the wall of the sleeve part by longitudinal cuts.

Since the elastic region can be deflected in relation to the first latching and mating latching elements in order to release the latching connection by a displacement or rotary movement of the sleeve part, the latching connection can be released extremely straightforwardly.

The deflection of the elastic region which is necessary for releasing the latching connection can be achieved by straight forward design results in that the elastic region is provided with a run-on slope which, during the displacement or rotary movement of the sleeve part, slides onto a mating slope formed on the other part.

An independent coupling-part unit is realized in that the further part is configured as an inner sleeve which is plugged into the sleeve part and, for its part, can have its free end connected to a further element.

A coupling part which is ready for use at all times is achieved in that the sleeve part and the inner sleeve are retained in their starting position in relation to one another by a resilient element and can be moved into their starting position again by the resilient element following a displacement or rotary movement of the sleeve part. As a result of the inner sleeve and the sleeve part automatically returning into their aligned starting position, the coupling part, following separation of a previous connection, is readily available again for the production of a new connection.

The situation where the first latching and mating latching elements snap back in an uncontrolled manner into the latching position again following release is prevented in that at least in each case one second latching and mating latching element are provided on the inner sleeve and the sleeve part. These elements assume their latching position in the release position of the first latching and mating latching elements, which is brought about by the displacement or rotary movement of the sleeve part, and, with the tubular or bar-shaped part plugged into the sleeve part, being retained in their latching position by the same. By virtue of the second latching and mating latching elements, the coupling part is locked in the release position of the first latching and mating latching elements, with the result that it is not possible for these elements to snap back into their latching position. Such a configuration of the coupling part, moreover, particularly facilitates single-handed operation.

An embodiment which is particularly favorable in configuration terms is characterized in that the second latching and mating latching elements are offset both circumferentially and axially in relation to the first latching and mating latching elements, the axial offset being provided in the direction in which the tubular or bar-shaped part is pulled out of the sleeve part. The axial offset in the pulling-out direction ensures that, when the tubular or bar-shaped part is pulled out, the release position of the first latching and mating latching elements is maintained until it is no longer possible for these elements to snap back into the latching position.

The coupling part is suitable, in particular, for connecting a vacuum-cleaner suction tube to the connector of a vacuum-cleaner nozzle.

Other features which are considered as characteristic for the invention are set forth in the appended claims.

Although the invention is illustrated and described herein as embodied in a coupling part by which at least one tubular or bar-shaped part is connected to a further part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic, longitudinal sectional view showing the coupling part with a tube plugged in and latched;

FIG. 4 is a diagrammatic, longitudinal sectional view showing the coupling part according to FIG. 3 that is offset through 90° in the circumferential direction;

DESCRIPTION OF THE PREFERRED EMBODIMENTS

Figure 1:
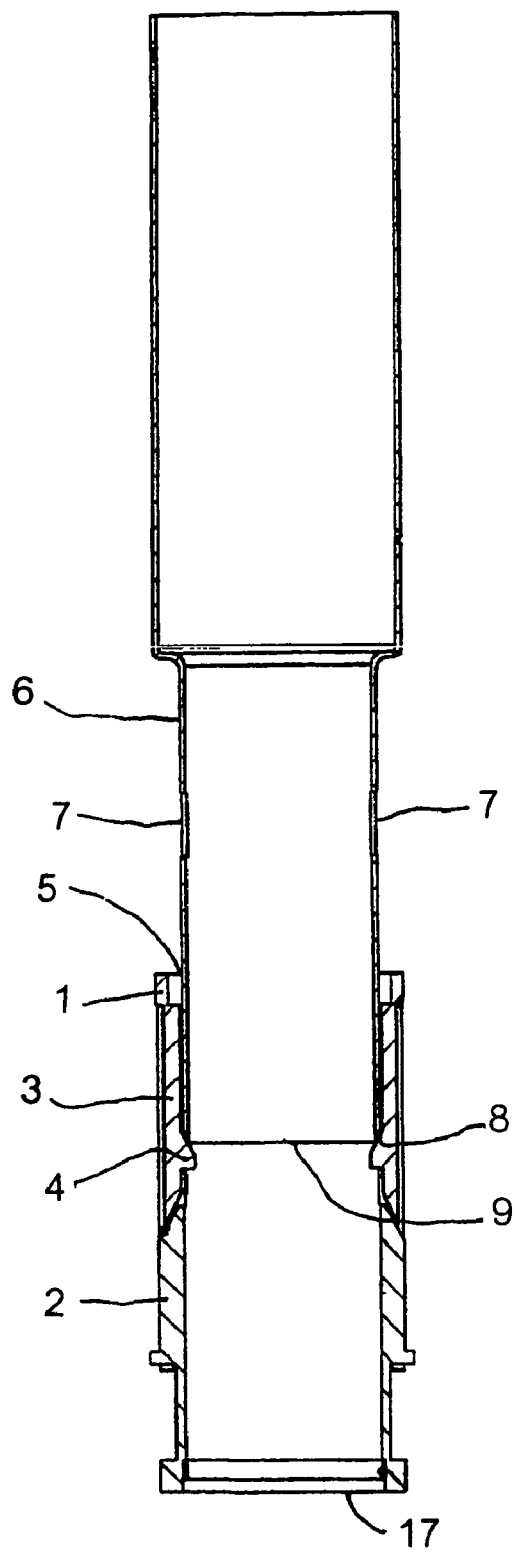
FIG. 1 is a diagrammatic, longitudinal sectional view of a coupling part with a tube plugged in, but not yet latched, according to the invention.

Referring now to the figures of the drawing in detail and first, particularly, to FIG. 1 thereof, there is shown a sleeve part 1 and an inner sleeve 2 which is plugged into the sleeve part 1. The sleeve part 1 is disposed such that it can be displaced in relation to the inner sleeve 2. On the sleeve part 1, non-illustrated longitudinal slots provided in a wall of the sleeve part form two elastic tongues 3, on which in each case one latching nose 4 is integrally formed as first latching elements. A tube 6 can be plugged into an opening 5 of the sleeve part 1. Cutout openings 7 are provided, as first mating latching elements, within that wall region of the tube 6 which can be plugged into the opening S. When the tube 6 is plugged into the sleeve part 1, a tube end 9 comes into contact with a sliding slope 8 provided on a rear of the latching noses 4 and slides along the same. The latching noses 4 are thus forced radially outward on account of the elasticity of the tongues 3. As soon as the latching noses 4 come to coincide with the cutout openings 7 as the tube 6 is pushed in further, the latching noses 4 snap into the cutout openings 7 (see FIG. 3). This secures the tube 6 in the sleeve part 1 against sliding out of the sleeve part 1.

Figure 2:
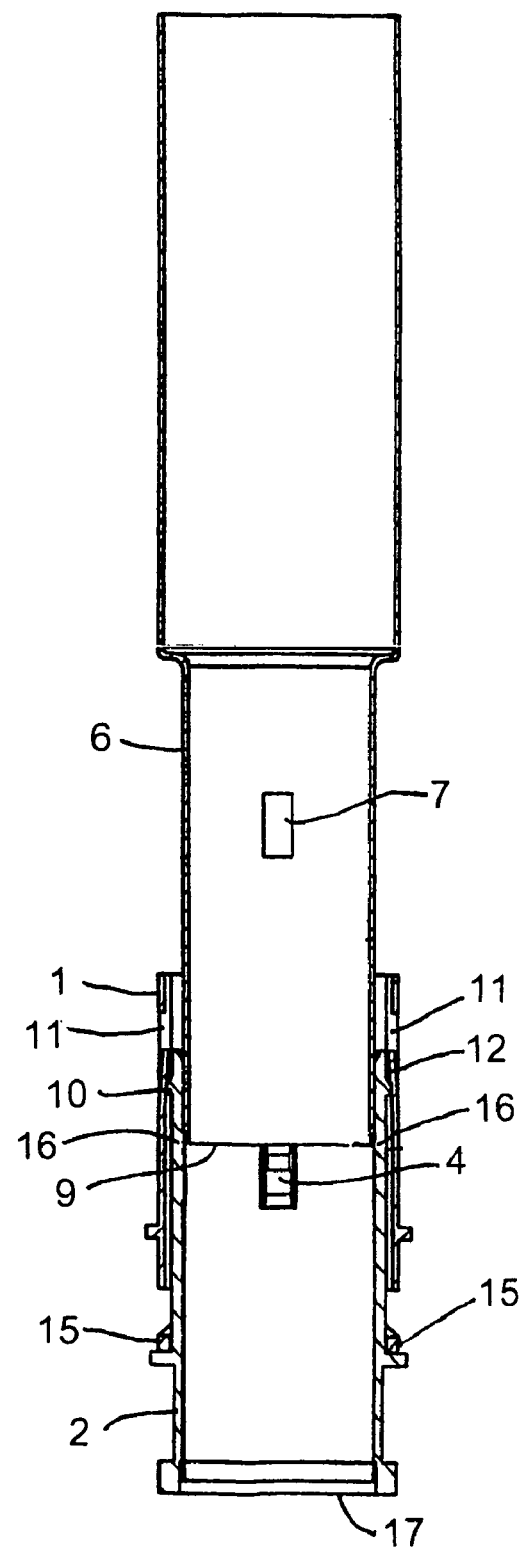
FIG. 2 is a diagrammatic, longitudinal sectional view showing the coupling part according to FIG. 1 that is offset through 90° in the circumferential direction.

As can be seen from FIG. 2, second latching elements in the form of latching hooks 10 are provided on the inner sleeve 2 in a position that is offset circumferentially through 90°. Slots 11 are formed in the wall of the sleeve part 1. At the bottom end of the slots 11, as seen in the direction in which the tube 6 is pushed in, in each case one lug 12 is bent to a slight extent in the radially inward direction from the wall of the sleeve part 1. The lugs 12 form the second mating latching elements. When the tube 6 has not been pushed in, and also when it has been pushed in, the second latching and mating latching elements 10 and 12 assume the position shown in FIGS. 2 and 4, in which there is no latching of these elements.

If the tube 6 is to be pulled out of the sleeve part 1, then the latching connection of the first latching and mating latching elements 4 and 7 has to be released. For this purpose, the sleeve part 1 is displaced on the inner sleeve 2. This displacement causes the elastic tongues 3 to slide, by way of a run-on slope 13 provided at their free end, along a mating slope 14 formed on the inner sleeve 2. This causes the tongues 3 to be forced radially outward, and the latching noses 4 integrally formed thereon are consequently pulled out of the cutout openings 7. The tube 6 is thus freed for a pulling-out movement.

Figures 5, 6:
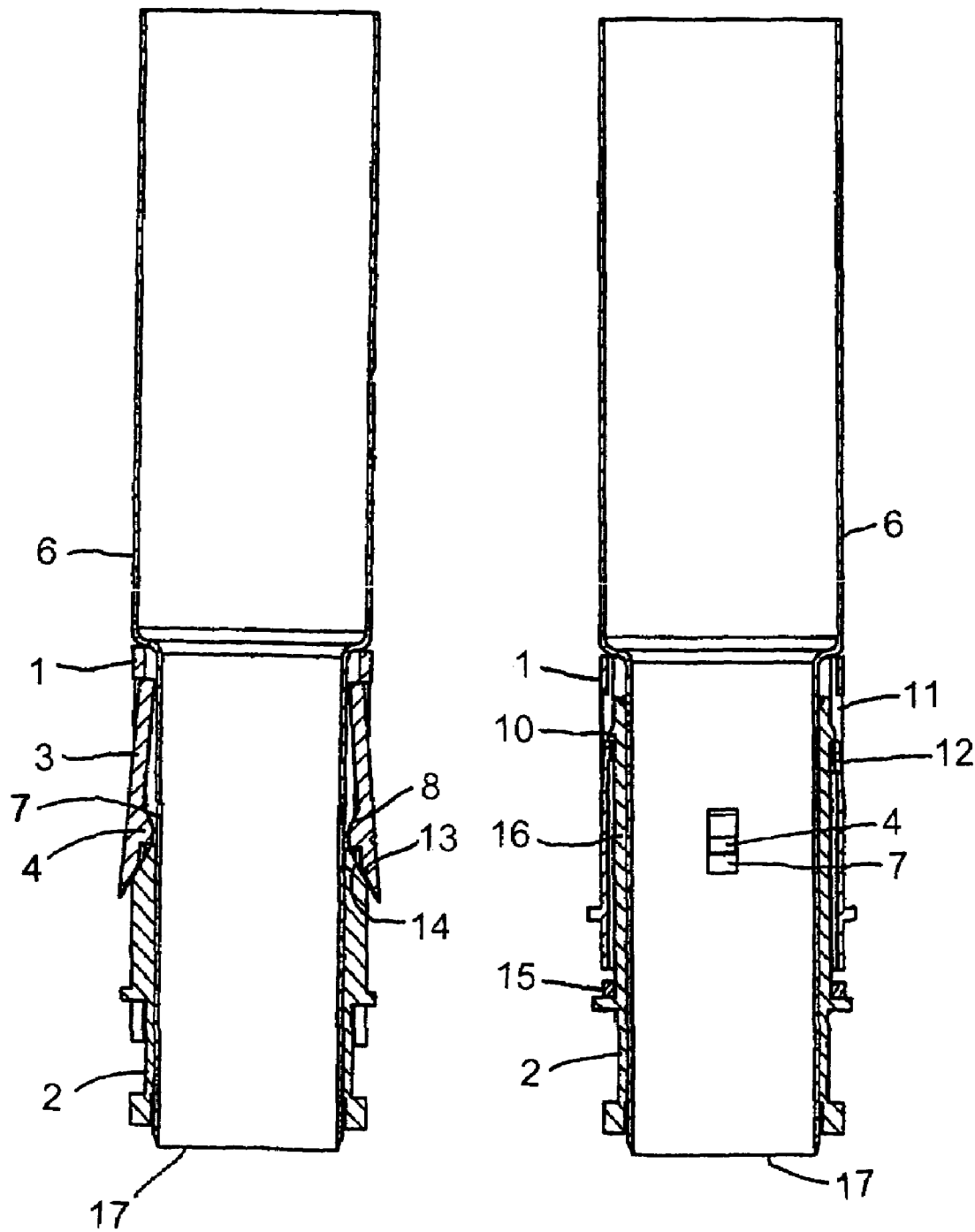
FIG. 5 is a diagrammatic, longitudinal sectional view showing the coupling part with a tube plugged in and unlatched.
FIG. 6 is a diagrammatic, longitudinal sectional view showing the coupling part according to FIG. 5 that is offset through 90° in the circumferential direction.

Upon axial displacement of the sleeve part 1, the lugs 12 slide over the latching hooks 10, which finally interlock with the edge of the lugs 12 (see FIG. 6). By virtue of a resilient element 15 that subjects the sleeve part 1 to an axial adjusting force, the lugs 12 are forced against the latching hooks 10 by way of their edge. The latching hooks 10 are integrally formed on wall strips 16 of the inner sleeve 2. These wall strips 16 are inclined to a slight extent in the radially inward direction in their rest position, i.e. when the tube 6 has not been pushed in. In the latching position between the lugs 12 and the latching hooks 10, they are thus subjected to prestressing, which is maintained by the pushed-in tube 6.

The latching position of the latching hooks 10 and lugs 12 corresponds to the release position of the first latching and mating latching elements, that is to say of the latching noses 4 and of the cut-out openings 7. If, then, the tube 6 is pulled out of the sleeve part 1 following release of the latching connection of the first latching and mating latching elements 4 and 7, the wall strips 16 are freed toward the end of the pulling-out section and, on account of their prestressing, spring back radially inward into their starting position. The latching between the latching hooks 10 and the lugs 12 is thus released and the sleeve part 1 is forced into its starting position again by the force of the resilient element 15.

The second latching and mating latching elements 10 and 12 prevent the first latching and mating latching elements 4 and 7 from snapping back into their latching position once their latching connection has been released. It is thus no longer necessary for an operator to hold the sleeve part 1 in its displaced position. This significantly facilitates handling (single-handed operation). Such single-handed operation is particularly advantageous if the inner sleeve 2 has its free end 17 fixed to the connector of a vacuum-cleaner nozzle. The suction tube and nozzle can then be separated particularly straightforwardly by virtue of the sleeve part 1 being displaced by one hand and the suction tube being pulled out of the connector using the same hand.

We claim:

1. A coupling part for connecting at least one first part, selected from the group consisting of tubular parts and bar-shaped parts, to a second part, the coupling part comprising:

at least one sleeve part for accommodating the first part, said sleeve part having an inside region with at least one first latching element disposed in said inside region, said first latching element interacting with a first mating latching element provided on the first part, and a first latching connection of said first latching element and the first mating latching element being releasable by an adjusting movement of said sleeve part;

wherein the second part is configured as an inner sleeve which is plugged into said sleeve part and, the second part has a free end for connecting to a further element;

wherein said sleeve part and the inner sleeve are retained in a starting position in relation to one another by a resilient element and can be moved into the starting position again by said resilient element following a displacement or rotary movement of said sleeve part;

said sleeve part has at least one second mating latching element;

the inner sleeve has at least one second latching element, the second latching element and said second mating latching element assume a second latching position in a released position of said first latching element and the first mating latching element, which is brought about by the displacement or rotary movement of said sleeve part, and, with the first part plugged into said sleeve part, the second latching element and said second mating latching element being retained in the second latching position by the first part remaining in said sleeve part.

2. The coupling part according to claim 1, wherein:
said sleeve part has elastic regions; and
said first latching element is a latching nose disposed at least on one of said elastic regions of said sleeve part, said latching nose being latched in the first mating latching element, the first mating latching element being selected from the group consisting of depressions and cutout openings formed in the first part.

3. The coupling part according to claim 2, wherein said sleeve part has a wall and said elastic region is a strip which is separated off from said wall of said sleeve part by longitudinal cuts formed in said wall.

4. The coupling part according to claim 2, wherein said elastic region can be deflected in relation to said first latching element and the first mating latching element for releasing the first latching connection by a displacement or rotary movement of said sleeve part.

5. The coupling part according to claim 4, wherein said elastic region has a run-on slope which, during the displacement or rotary movement of said sleeve part, slides onto a mating slope formed on the second part.

6. The coupling part according to claim 1, wherein the second latching element and said second mating latching element are offset both circumferentially and axially in relation to said first latching element and the first mating latching element, an axial offset being disposed in a direction in which the first part is pulled out of said sleeve part.

7. The coupling part according to claim 1, wherein the first part includes a vacuum cleaner suction tube and the inner sleeve includes a vacuum cleaner nozzle connector.

8. A coupling part for connecting at least one first part, selected from the group consisting of tubular parts and bar-shaped parts, to an inner sleeve, the coupling part comprising:

at least one sleeve part for accommodating the first part, said sleeve part having an inside region with at least one first latching element disposed in said inside region, said first latching element interacting with a first mating latching element provided on the first part, and a first latching connection of said first latching element and the first mating latching element being releasable by an adjusting movement of said sleeve part;

said inner sleeve being plugged into said sleeve part and, said inner sleeve has a free end for connecting to a further element;

a resilient element, said sleeve part and said inner sleeve are retained in a starting position in relation to one another by said resilient element and can be moved into the starting position again by said resilient element following a displacement or rotary movement of said sleeve part;

said sleeve part has at least one second mating latching element;

said inner sleeve has at least one second latching element, said second latching element and said second mating latching element assume a second latching position in a released position of said first latching element and the first mating latching element, which is brought about by the displacement or rotary movement of said sleeve part, and, with the first part plugged into said sleeve part, said second latching element and said second mating latching element being retained in the second latching position by the first part remaining in said sleeve part.

9. The coupling part according to claim 8, wherein said second latching element and said second mating latching element are offset both circumferentially and axially in relation to said first latching element and the first mating latching element, an axial offset being disposed in a direction in which the first part is pulled out of said sleeve part.

* * * * *